US007536050B2

(12) United States Patent
Boykov et al.

(10) Patent No.: US 7,536,050 B2
(45) Date of Patent: May 19, 2009

(54) USING GRAPH CUTS FOR EDITING PHOTOGRAPHS

(75) Inventors: Yuri Boykov, London (CA); Marie-Pierre Jolly, Hillsborough, NJ (US)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 11/772,915

(22) Filed: Jul. 3, 2007

(65) Prior Publication Data

US 2007/0292025 A1 Dec. 20, 2007

Related U.S. Application Data

(63) Continuation of application No. 10/413,974, filed on Apr. 15, 2003, now abandoned.

(60) Provisional application No. 60/393,163, filed on Jul. 2, 2002.

(51) Int. Cl.
*G06K 9/34* (2006.01)
(52) U.S. Cl. ........................ 382/173; 382/171
(58) Field of Classification Search ................ 382/171, 382/173, 209, 225, 159, 300, 203, 128, 164, 382/180, 226, 154, 253, 309; 348/159; 345/420, 345/424, 427; 702/153
See application file for complete search history.

(56) References Cited

U.S. PATENT DOCUMENTS

| 6,230,312 B1* | 5/2001 | Hunt ........................ 717/108 |
| 6,973,212 B2* | 12/2005 | Boykov et al. ............. 382/173 |
| 7,212,201 B1* | 5/2007 | Geiger et al. ............... 345/420 |

OTHER PUBLICATIONS

Boykov et al., "Interactive Graph Cuts for Optimal Boundary & Region Segmentation of Objects in N-D Images", IEEE, vol. 1, Jul. 2001, pp. 105-112.*

* cited by examiner

*Primary Examiner*—Anh Hong Do
(74) *Attorney, Agent, or Firm*—Donald B. Paschburg; F. Chau & Associates, LLC (57) ABSTRACT

An image editing system comprises an input device for inputting an image, a graphical user interface for selecting background and object seeds for the image, and an image processor for editing the image. The image processor has various editing routines, including a segmentation routine that builds a graph associated with the image and uses a graph cut algorithm to cut the graph into segments. The user marks certain pixels as "object" or "background" to provide hard constraints for segmentation. Additional soft constraints incorporate both boundary and regional information. Graph cuts are used to find the globally optimal segementation of the image. The obtained solution gives the best balance of boundary and region properties satisfying the constraints.

25 Claims, 6 Drawing Sheets

Details of segmentation with regional term

FIG. 5a

Details of segmentation without regional term

FIG. 5b

FIG. 6

USING GRAPH CUTS FOR EDITING PHOTOGRAPHS

CROSS REFERENCE TO RELATED APPLICATIONS

This application is a continuation of U.S. patent application Ser. No. 10/413,974, filed on Apr. 15, 2003, now abandoned which claims the benefit of U.S. Provisional Application Ser. No. 60/393,163, filed on Jul. 2, 2002, which is incorporated by reference herein in its entirety.

FIELD OF THE INVENTION

The present invention relates to image processing systems, and, more particularly to a technique for interactive segmentation of images using graph cuts.

BACKGROUND OF THE INVENTION

Various types of software products for editing digital images exist in the marketplace. Although many of these products perform basic editing tasks such as cutting, cropping, and touching-up reasonably well, it can be difficult to segment images using these products. Segmentation involves isolating a desired portion of an image and separating that portion from the rest of the image.

Conventionally, some photo-editors provide segmentation tools based on user-based seeds that must be placed on desired segmentation boundaries. However, this is often a tedious task since the seeds must be very carefully placed. For instance, it is usually necessary to place numerous seeds directly on the boundary. Although some conventional photo-editors do provide for more relaxed seed placement, these segmentation tools tend to produce inaccurate results.

Accordingly, it would be desirable and highly advantageous to provide improved segmentation techniques for photo-editing that overcome the problems of conventional approaches.

SUMMARY OF THE INVENTION

In various embodiments of the present invention, an image editing system comprises an input device for inputting an image, a graphical user interface for selecting background and object seeds for the image, and an image processor for editing the image. The image processor has various editing routines, including a segmentation routine that builds a graph associated with the image and uses a graph cut algorithm to cut the graph into segments. The user marks certain pixels as "object" or "background" to provide hard constraints for segmentation. Additional soft constraints incorporate both boundary and regional information. Graph cuts are used to find the globally optimal segementation of the image. The obtained solution gives the best balance of boundary and region properties satisfying the constraints.

According to various embodiments of the present invention, the nodes of the graph represent portions of the image, such as pixels (voxels). The edges of the graph represent neighborhood relationships among the nodes. The graph also includes a background terminal node and an object terminal node. Each of the non-terminal nodes of the graph is connected to both the background terminal node and the object terminal node.

The edges of the graph are each assigned a cost value. The cost values are preferably determined according to a cost function that is defined in terms of boundary and region properties of segments. In addition, the cost function uses the seed positions to assign cost values. A graph cut is performed using a suitable graph cut algorithm. Inexpensive edges are attractive choices for a minimum graph cut.

The image editing system can further be configured with an output device (e.g, computer monitor, printer) for outputting the segmented image. The graphical user interface allows additional background and object seeds to be input. By reviewing the results of initial segmentation, the user will see which areas of the image were incorrectly segmented. Then the user can place additional seeds to correct the problem. This interactive process of adding seeds may be continued until the user obtains satisfactory results.

These and other aspects, features and advantages of the present invention will become apparent from the following detailed description of preferred embodiments, which is to be read in connection with the accompanying drawings.

DESCRIPTION OF PREFERRED EMBODIMENTS

Figure 1:
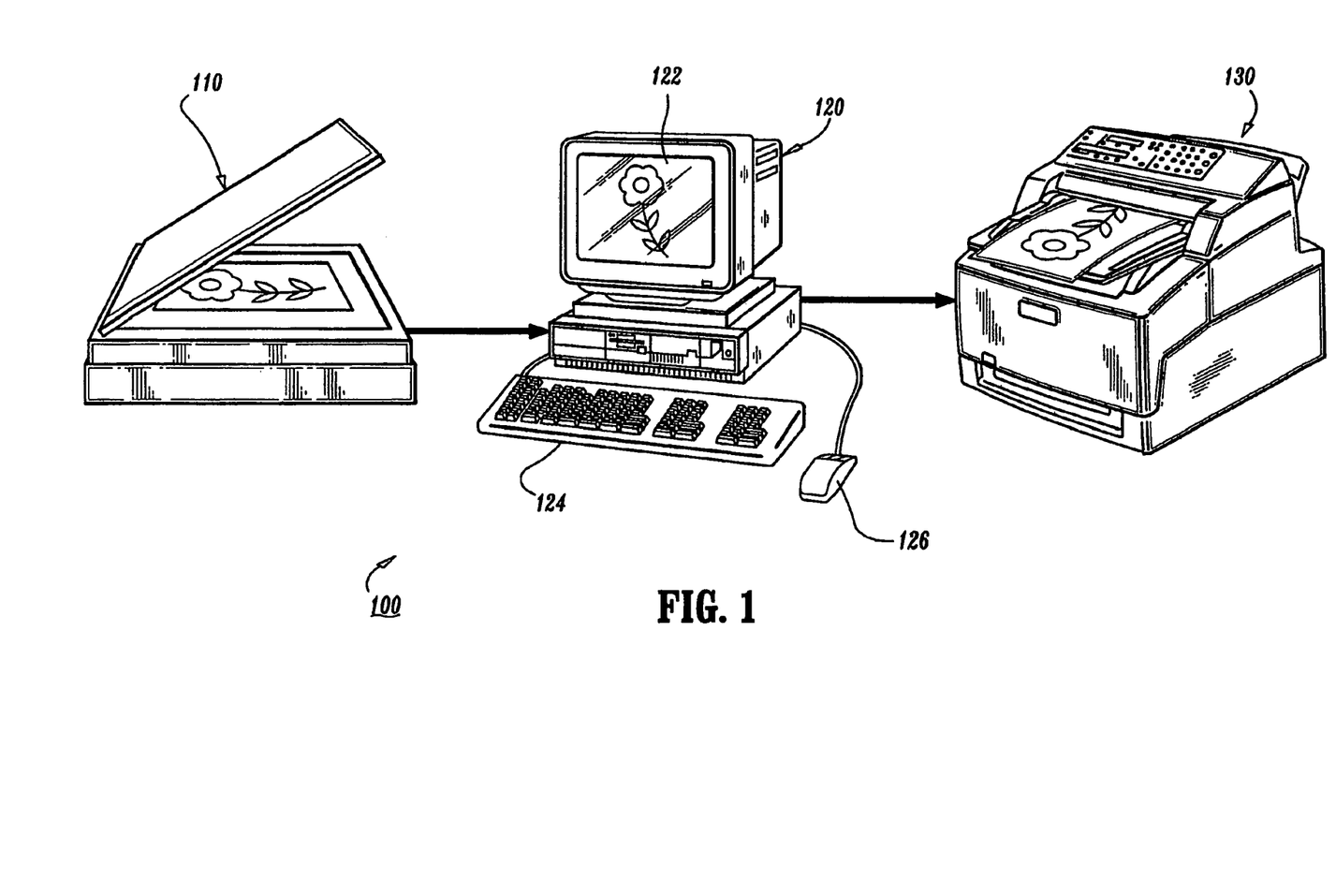
FIG. 1 is a block diagram of a typical photo-editing system.

Referring to FIG. 1, a typical photo-editing system 100 includes a scanner 110 (or other digital image source, such as a digital camera), a personal computer 120 (or other digital image processor) with a keyboard 124 and mouse 126 (or other input devices), a printer 130 (or other output devices). Except for certain aspects of the software, to be discussed in detail hereinafter, the photo-editing system may comprise commercially available hardware and software components, assembled in a manner that will be readily apparent to one skilled in the art.

Figure 2:
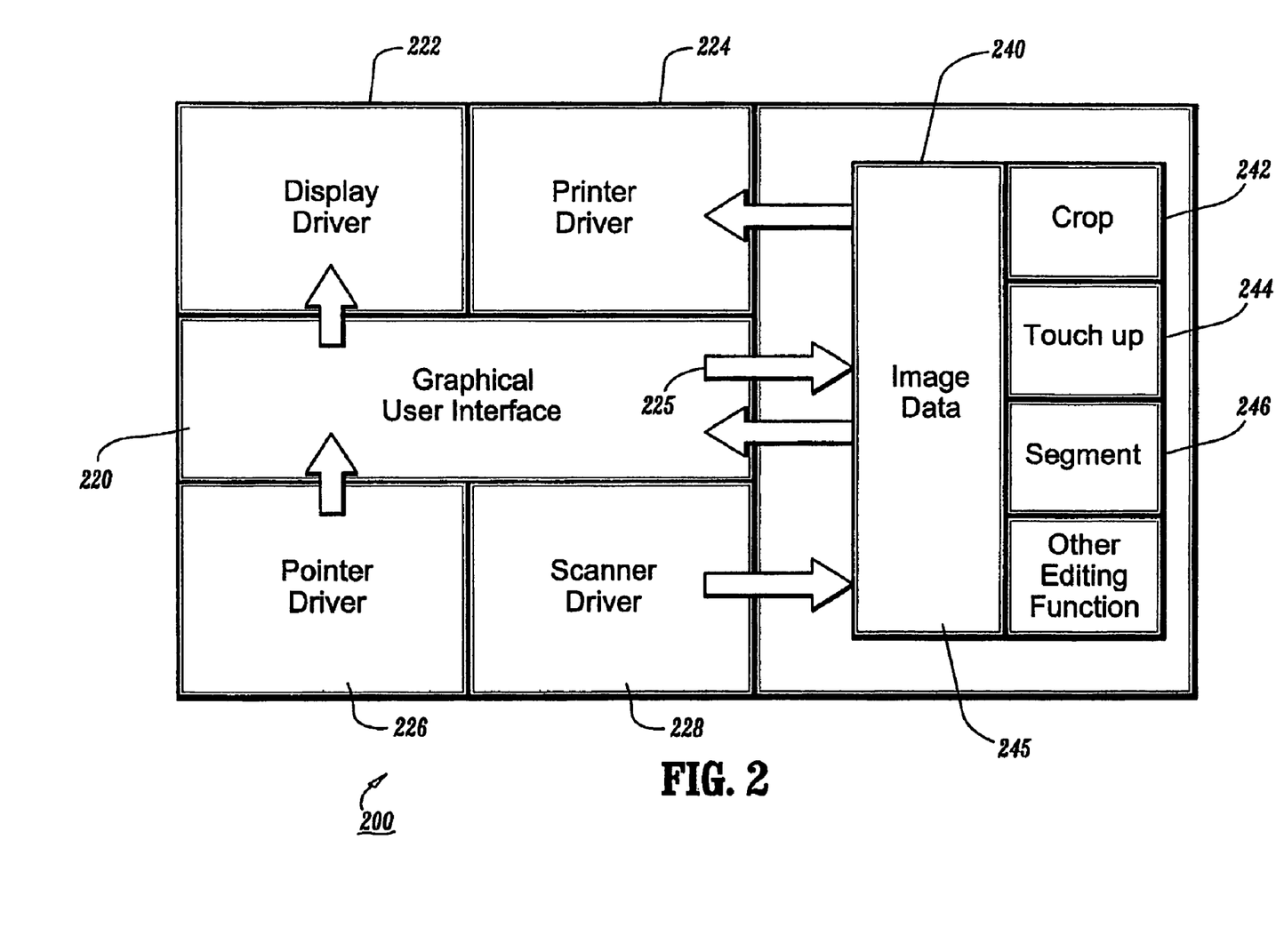
FIG. 2 is a block diagram of various routines associated with an embodiment of the present invention.

In an exemplary embodiment of the present invention, as shown in simplified block diagram form in FIG. 2, the software 200 that controls the personal computer 120 includes an operating system (such as MICROSOFT WINDOWS™) having a graphical user interface 220 whereby a user may use a pointing device, such as the mouse 126, via a pointer driver 226 to select and operate various controls (e.g., buttons, menus) appearing on the screen of monitor 122 under control of the display driver 222 thereby generating control signal inputs 125 to an application program such as an image processor 240. The image processor 240 can include various routines for performing various editing and other imaging functions. For instance, the image processor 240 can interact with a cropping routine 242 for trimming an image, a touch-up routine 244 for making small changes and corrections to an image, and a segmentation routine 246 for separating portions of an image. The segmentation routine 246 is described in greater detail hereinafter with respect to FIGS. 3-6. The image processor 240 also includes an image memory 245 for storing in known fashion the original image. The image processor 240 receives image data from the scanner 110 via a scanner driver 228 and outputs image data not only to the monitor 122 via graphics user interface 220, but also via printer driver 224 to the printer 130.

Figure 3A:
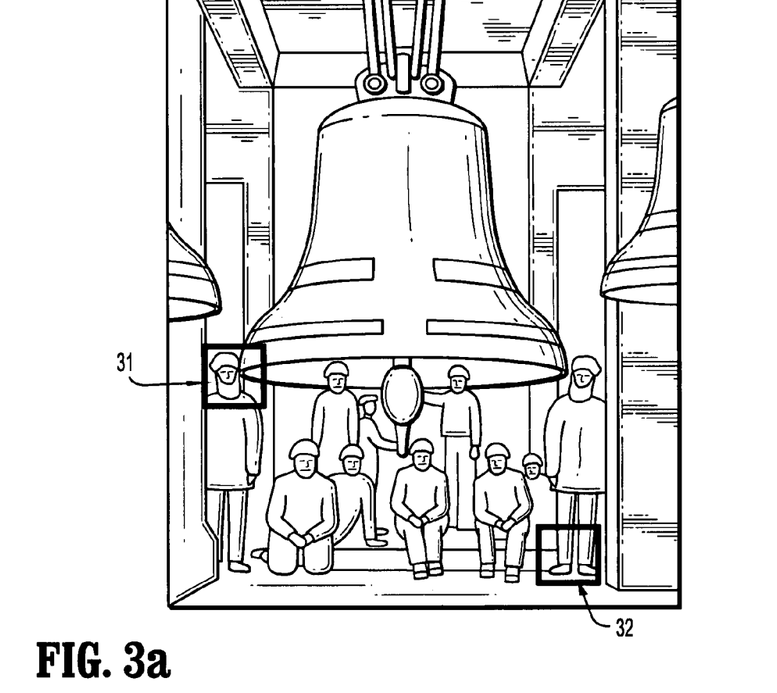
FIGS. 3a-b illustrates segmentation of a photograph using graph cuts.
Figure 3B:
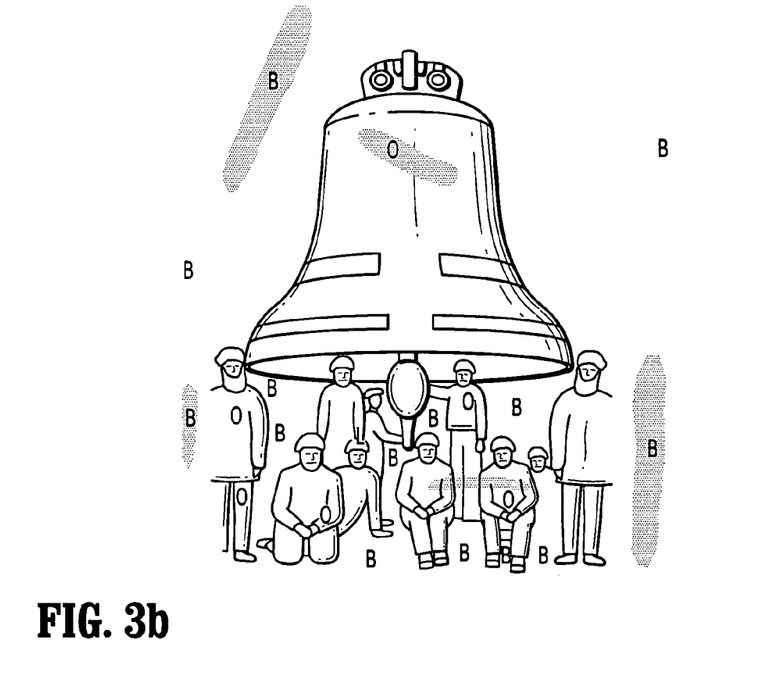

Referring to FIGS. 3(a) and 3(b) the process of using the segmentation routine 246 is illustrated. FIG. 3(a) shows an original photograph that was inputted into the image processor 240. FIG. 3(b) shows a bell and group of people segmented from this photograph. FIGS. 3(a) and 3(b) are more fully described herein below in the "Photo and Video Editing" section. A user can start by entering a few "object" and "background" seeds loosely positioned inside and, correspondingly, outside the object(s) of interest (i.e., the bell and group of people). By reviewing the results of initial segmentation the user will see which areas are segmented incorrectly. Then the user can put additional seeds into the troubled places. This interactive process of adding seeds may be continued until the user obtains satisfactory results.

The present invention provides a general-purpose interactive segmentation technique that divides an image into two segments: "object" and "background". A user imposes certain hard constraints for segmentation by indicating certain pixels (seeds) that have to be part of the object and certain pixels that have to be part of the background. Intuitively, these hard constraints provide clues on what the user intends to segment. The rest of the image is segmented automatically by computing a global optimum among all segmentations satisfying the hard constraints. A cost function is defined in terms of boundary and region properties of the segments. These properties can be viewed as soft constraints for segmentation. A globally optimal segmentation can be very efficiently recomputed when the user adds or removes any hard constraints (seeds). This allows the user to get any desired segmentation results quickly via very intuitive interactions. This method applies to all N-D images (volumes).

One of the main advantages of the interactive segmentation method employed herein is that it provides a globally optimal solution for the N-dimensional segmentation when the cost function is clearly defined. Some earlier techniques can do that only in 2D applications when a segmentation boundary is a 1D curve. Other techniques either don't have a clear cost function at all (e.g., region growing, split and merger) or compute only an approximate solution (e.g., a local minimum) that can be arbitrarily far from the global optimum (region competition, level set methods, normalized cuts). Global properties of such segmentation may be difficult to analyze or predict. Imperfections in the result might come from deficiencies at the minimization stage. In contrast, imperfections of a globally optimal solution are directly related to the definition of the cost function. Thus, the segmentation can be controlled more reliably.

It is also important that the cost function used as a soft constraint for segmentation is general enough to include both region and boundary properties of segments. Consider an arbitrary set of data elements P and some neighborhood system represented by a set N of all unordered pairs $\{p,q\}$ of neighboring elements in P. For example, P can contain pixels (or voxels) in a 2D (or 3D) grid and N can contain all unordered pairs of neighboring pixels (voxels) under a standard 8-(or 26-) neighborhood system. Let $A=(A_1, \ldots, A_p, \ldots, A_{|P|})$ be a binary vector whose components $A_p$ specify assignments to pixels p in P. Each $A_p$ can be either "obj" or "bkg" (abbreviations of "object" and "background"). Vector A defines a segmentation. Then, the soft constraints that we impose on boundary and region properties of A are described by the cost function E(A):

$$E(A) = \lambda \cdot R(A) + B(A) \quad (1)$$

where $$R(A) = \sum_{p \in P} R_p(A_p) \quad (2)$$

$$B(A) = \sum_{\{p,q\} \in N} B_{\{p,q\}} \cdot \delta(A_p, A_q) \quad (3)$$

and $$\delta(A_p, A_q) = \begin{cases} 1 & \text{if } A_p \neq A_q \\ 0 & \text{otherwise.} \end{cases}$$

The coefficient $\lambda \geq 0$ in (1) specifies the relative importance of the region properties term R(A) versus the boundary properties term B(A). The regional term R(A) assumes that the individual penalties for assigning pixel p to "object" and "background", correspondingly $R_p(\cdot)$ may reflect on how the intensity of pixel p fits into a known intensity model (e.g., histogram) of the object and background.

The term B(A) comprises the "boundary" properties of segmentation A. Coefficient $B_{\{p,q\}} \geq 0$ should be interpreted as a penalty for discontinuity between p and q. Normally, $B_{\{q,p\}}$ is large when pixels p and q are similar (e.g., in their intensity) and $B_{\{q,p\}}$ is close to zero when the two are very different. The penalty $B_{\{q,p\}}$ can also decrease as a function of distance between p and q. Costs $B_{\{q,p\}}$ may be based on local intensity gradient, Laplacian zero-crossing, gradient direction, and other criteria.

Hard constraints that indicate segmentation regions rather than the boundary are considered. It is assumed that some pixels were marked as internal and some as external for the given object of interest. The subsets marked pixels will be referred to as "object" and "background" seeds. The segmentation boundary can be anywhere but it has to separate the object seeds from the background seeds. Note that the seeds can be loosely positioned inside the object and background regions. The segmentation technique described herein is quite stable and normally produces the same results regardless of particular seed positioning within the same image object.

Obviously, the hard constraints by themselves are not enough to obtain a good segmentation. A segmentation method decides how to segment unmarked pixels. Some conventional techniques use the same type of hard constraints as the present invention but they do not employ a clear cost function and segment unmarked pixels based on variations of "region growing". Since the properties of segmentation boundary are not optimized, the results are prone to "leaking" where the boundary between objects is blurry. In contrast, the present invention combines the hard constraints as above with energy (1) that incorporates region and boundary properties of segments.

The segmentation technique described herein is based on powerful graph cut algorithms from the field of combinational optimization. The implementation uses a new version of the "max-flow" algorithm. Next we provide some terminology for graph cuts and provide some background information.

Graph Cuts

First, we describe the basic terminology that pertains to graph cuts in the context of our segmentation method. An undirected graph $G=\langle V,E \rangle$ is defined as a set of nodes (vertices V) and a set of undirected edges (E) that connect these nodes.

Figure 4:
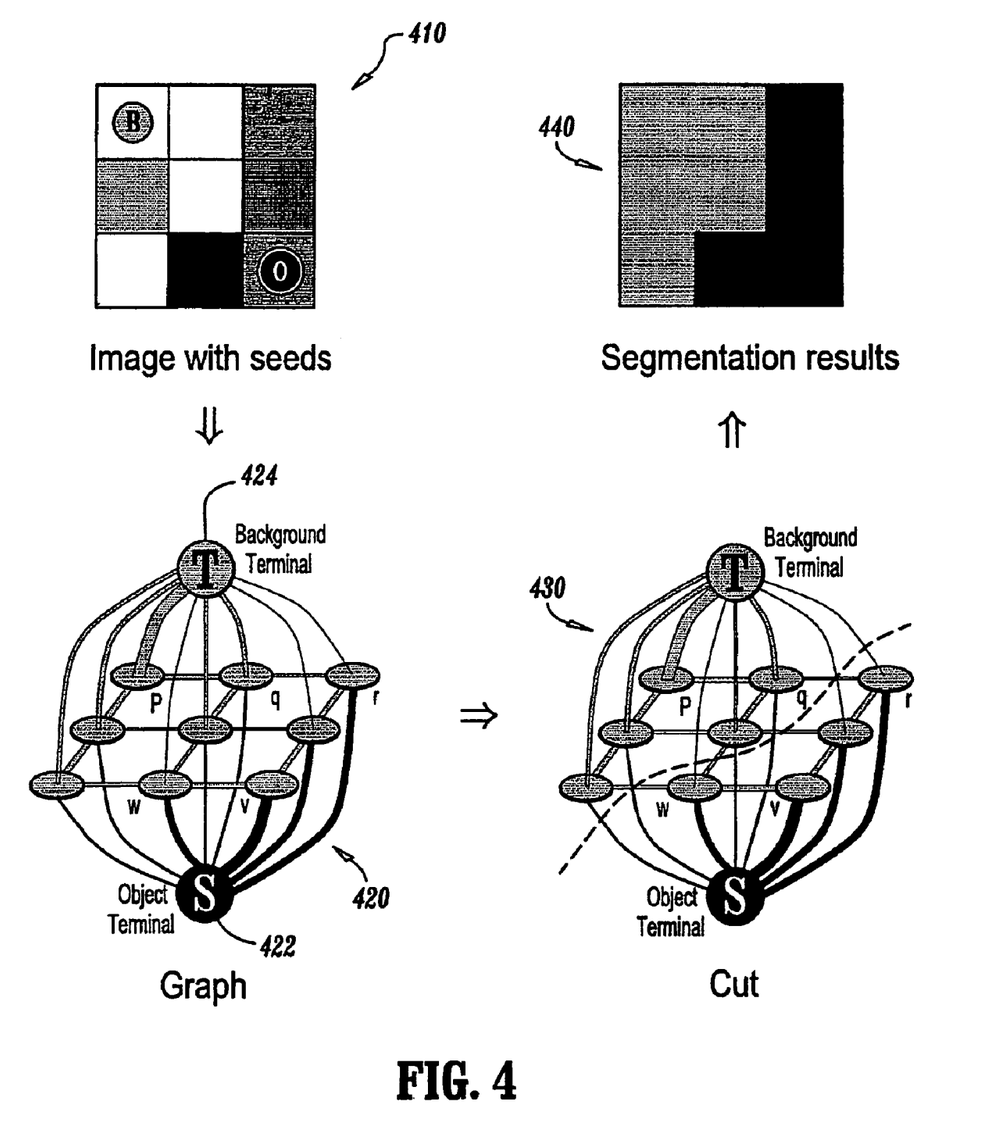
FIG. 4 is a workflow diagram showing the use of graph cuts to perform segmentation of a 2D image.

An example of a graph that we use in this paper is shown in FIG. 4(a). Each edge e∈E in the graph is assigned a nonnegative weight (cost) $w_e$. There are also two special nodes called terminals. A cut is a subset of edges C ⊂ E such that the terminals become separated on the induced graph G(C)=⟨V,E\C⟩. It is normal in combinatorial optimization to define the cost of a cut as the sum of costs of the edges that it severs $$|C| = \sum_{e \in C} w_e.$$

Graph cut formalism is well suited for segmentation of images. In fact, it is completely appropriate for N-dimensional volumes. The nodes of the graph can represent pixels (or voxels) and the edges can represent any neighborhood relationship between the pixels. A cut partitions the node in the graph. As illustrated in FIGS. 4(c) and (d), this partitioning corresponds to a segmentation of the underlying image or volume. A minimum cost cut generates a segmentation that is optimal in terms of properties that are built into the edge weights.

Segmentation Technique

In this section we provide algorithmic details about the segmentation technique. Assume that O and B denote the subsets of pixels marked as "object" and "background" seeds. Naturally, the subsets O ⊂ P and B ⊂ P are such that O∩B=φ. Remember that our goal is to compute global minimum of (1) among all segmentations A satisfying hard constraints $$\forall p \in O, A_p = \text{"obj"} \quad (4)$$

$$\forall p \in B, A_p = \text{"bkg"} \quad (5)$$

The general work flow is described in conjunction with FIG. 4. Given an image 410 we create a graph 420 with two terminals 422, 424. The edge weights reflect the parameters in the regional (2) and the boundary (3) terms of the const function, as well as the known positions of seeds in the image.

The next step is to compute the globally optimal minimum cut. This cut gives a segmentation 430 of the original image 410. In the simplistic examples of FIG. 3 the image is divided into exactly one "object" and one "background" region. In general, our segmentation method generates binary segmentation with arbitrary topological properties. Other examples will illustrate that object and background segments may comprise several isolated connected blobs in the image.

Below we describe the details of the graph and prove that the obtained segmentation is optimal. To segment a given image we create a graph G=⟨V,E⟩ with nodes corresponding to pixels p∈P of the image. There are two additional nodes: an "object" terminal (a source S) and a "background" terminal (a sink T). Therefore,

V=P∪{S,T}.

The set of edges E consists of two types of undirected edges: n-links (neighborhood links) and t-links (terminal links). Each pixel p has two t-links {p,S} and {p,T} connecting it to each terminal. Each pair of neighboring pixels {p,q} in N is connected by an n-link. Without introducing any ambiguity, an n-link connecting a pair of neighbors p and q will be denoted {p,q}. Therefore, $$E = N \cup \bigcup_{p \in P} \{\{p, S\}, \{p, T\}\}.$$

The following table gives weights of edges in E

| edge | weight (cost) | for |
|---|---|---|
| {p, q} | $B_{\{p,q\}}$ | {p, q}∈ N |
| {p, S} | $\lambda \cdot R_p(\text{"bkg"})$ | p ∈ P, p ∉ O ∪ B |
|  | K | p ∈ O |
|  | 0 | p ∈ B |
| {p, T} | $\lambda \cdot R_p(\text{"obj"})$ | p ∈ P, p ∉ O ∪ B |
|  | 0 | p ∈ O |
|  | K | p ∈ B | where $$K = 1 + \max_{q:\{p,q\} \in N} \sum B_{\{p,q\}}.$$

The graph G is now completely defined. We draw the segmentation boundary between the object and the background by finding the minimum cost cut on the graph G. The minimum cost cut $\hat{C}$ on G can be computed exactly in polynomial time via algorithms for two terminal graph cuts assuming that the edge weights specified in the table above are non-negative.

Below we state exactly how the minimum cut $\hat{C}$ defines a segmentation $\hat{A}$ and prove this segmentation is optimal. We need one technical lemma. Assume that F denotes a set of all feasible cuts C on graph G such that C severs exactly one t-link at each p {p,q}∈ C iff p, q are t-linked to different terminals if p∈ O then {p,T}∈ C if p∈ B trhen {p,S}∈ C.

Lemma 1 The minimum cut on G is feasible, i.e., $\hat{C} \in F$.

Proof: $\hat{C}$ severs at least one t-link at each pixel since it is a cut that separates the terminals. On the other hand, it cannot sever both t-links. In such a case it would not be minimal since one of the t-links could be returned. Similarly, a minimum cut should sever an n-link {p,q} if p and q are connected to the opposite terminals just because any cut must separate the terminals. If p and q are connected to the same terminal, then $\hat{C}$ should not sever unnecessary n-link {p,q} due to its minimality. The last two properties are true for $\hat{C}$ because the constant K is larger than the sun of all n-links costs for any given pixel p. For example, if p∈ O and $\hat{C}$ severs {p,s} (costs K) then we would construct a smaller cost cut by restoring {p,S} and severing all n-links from p (costs less than K) as well as the opposite t-link {p,T} (zero cost).

For any feasible cut C ∈ F we can define a unique corresponding segmentation A(C) such that $$\begin{cases} \text{"obj"}, & \text{if } \{p, T\} \in C \\ \text{"bkg"}, & \text{if } \{p, S\} \in C. \end{cases} \quad (6)$$

The definition above is coherent since any feasible cut severs exactly one of the two t-links at each pixel p. The lemma showed that a minimum cut $\hat{C}$ is feasible. Thus, we can define a corresponding segmentation $\hat{A}=A(\hat{C})$. The next theorem completes the description of our algorithm. Theorem 1

The segmentation $\hat{A}=A(\hat{C})$ defined by the minimum cut $\hat{C}$ as in (6) minimizes (1) among all segmentations satisfying constraints (4, 5).

Proof: Using the table of edge weights, definition of feasible cuts F, and equation (6) one can show that a cost of any C ∈ F is $$|C| = \sum_{p \notin O \cup B} \lambda \cdot R_p(A_p(C)) + \sum_{\{p,q\} \in N} B_{\{p,q\}} \cdot \delta(A_p(C), A_q(C))$$

$$= E(A(C)) - \sum_{p \in O} \lambda R_p(\text{"obj"}) - \sum_{p \in B} \lambda R_p(\text{"bkg"}).$$

Therefore, $|C|=E(A(C))-\text{const}(C)$. Note that for any $C \in F$ assignment A(C) satisfies constraints (4, 6). In fact, equation (6) gives one-to-one correspondence between the set of all feasible cuts in F and the set H of all assignments A that satisfy hard constraints (4, 5). Then, $$E(\hat{A}) = |\hat{C}| + \text{const} = \min_{C \in F} |C| + \text{const}$$

$$= \min_{C \in F}(E(A(C)) = \min_{A \in H} E(A)$$

and the theorem is proved.

To conclude this section we would like to show that the algorithm can efficiently adjust the segmentation to incorporate any additional seeds that the user might interactively add. To be specific, assume that a max-flow algorithm is used to determine the minimum cut G. The max-flow algorithm gradually increases the flow sent from the source S to the sink T along the edges in G given their capacities (weights). Upon termination the maximum flow saturates the graph. The saturated edges correspond to the minimum cost cut on G giving us an optimal segmentation.

Assume now that an optimal segmentation is already computed for some initial set of seeds. A user adds a new "object" seed to pixel p that was not previously assigned any seed. We need to change the costs for two t-links at p

| t-link | initial cost | new cost |
|--------|--------------|----------|
| {p, S} | $\lambda R_p(\text{"bkg"})$ | K |
| {p, T} | $\lambda R_p(\text{"obj"})$ | 0 | and then compute the maximum flow (minimum cut) on the new graph. In fact, we can start from the flow found at the end of initial computation. The only problem is that reassignment of edge weights as above reduces capacities of some edges. If there is a flow through such an edge then we may break the flow consistency. Increasing an edge capacity, on the other hand, is never a problem. Then, we can solve the problem as follows.

To accommodate the new "object" seed at pixel p we increase the t-links weights according to the table

| t-link | initial cost | add | new cost |
|--------|--------------|-----|----------|
| {p, S} | $\lambda R_p(\text{"bkg"})$ | $K + \lambda R_p(\text{"obj"})$ | $K + c_p$ |
| {p, T} | $\lambda R_p(\text{"obj"})$ | $\lambda R_p(\text{"bkg"})$ | $c_p$ |

These new costs are consistent with the edge weight table for pixels in O since the extra constant $c_p$ at both t-links of a pixel does not change the optimal cut. Then, a maximum flow (minimum cut) on a new graph can be efficiently obtained starting from the previous flow without re-computing the whole solution from scratch.

Note that the same trick can be done to adjust the segmentation when a new "background" seed is added or when a seed is deleted. One has to figure the right amounts that have to be added to the costs of two t-links at the corresponding pixel. The new costs should be consistent with the edge weight table plus or minus the same constant.

EXAMPLES

We demonstrate the general-purpose segmentation method in several examples including photo/video editing. We show original data and segments generated by our technique for a given set of seeds. Our actual interface allows a user to enter seeds via mouse operated brush of red (for object) or blue (for background) color. Due to limitations of the B&W publication we show seeds as strokes of white (object) or black (background) brush. In addition, these strokes are marked by the letters "O" and "B". For the purpose of clarity, we employ different methods for the presentation of segmentation results in our examples below.

Our current implementation actually makes a double use of the seeds entered by a user. First of all, they provide the hard constraints for the segmentation process as discussed above. In addition, we use intensities of pixels (voxels) marked as seeds to get histograms for "object" and "background" intensity distributions: Pr(I|O) and Pr(I|B). Then, we use these histograms to set the regional penalties $R_p(\cdot)$ as negative log-liklihoods:

$R_p(\text{"obj"})=-\ln Pr(I_p|O)$ $R_p(\text{"bkg"})=-\ln Pr(I_p|B)$.

To set the boundary penalties we use an ad-hoc function $$B_{\{p,q\}} \propto \exp\left(-\frac{(I_p - I_q)^2}{2\sigma^2}\right) \cdot \frac{1}{dist(p,q)}$$

This function penalizes a lot for discontinuities between pixels of similar intensities when $|I_p-I_q|<\sigma$. However, if pixels are very different, $|I_p-I_q|>\sigma$, then the penalty is small. Intuitively, this function corresponds to the distribution of noise among neighboring pixels of an image. Thus, σ can be estimated as "camera noise".

Note that we use an 8-neighborhood system in 2D examples and 26-neighborhood system in 3D examples. All running times are given for 333 MHz Pentium III. Our implementation uses a new "max-flow" algorithm from [2].

Photo and Video Editing

In FIGS. 3(a)-(b) we illustrated the segmentation a bell with a group of people from a photograph. The user can start with a few "object" and "background" seeds loosely positioned inside and, correspondingly, outside the object(s) of interest, as indicated by the letters 'O' and 'B' appearing in FIG. 3(b). By reviewing the results of initial segmentation the user will see what areas are segmented incorrectly. Then (s)he can put additional seeds into the troubled places and efficiently recomputed the optimal segmentation. This process of adding seeds gives more clues to the algorithm and may be confined until the user likes the results. Boxed regions 31 and 32 in FIG. 3(a) are enlarged in FIGS. 5(a) and 5(b) and are described herein below in connection with those figures.

Naturally, the hope is that the method can quickly identify the right object. The user would not like to keep adding new seeds until the whole image is covered in seeds. This is no better than manual segmentation. The performance of the algorithm can be judged by the efforts required from the user. Thus, the results of our segmentation are shown with seeds that we entered to get this segmentation.

Our segmentation algorithm runs in less than a second for most 2D images (up to 512×512) with a fixed set of seeds. When additional seeds are entered the solution is recomputed in the blink of an eye. Thus, the speed evaluation of our method in 2D is mainly concerned with the user efforts. The detailed segmentation in FIG. 3(b) is obtained in approximately a minute. Note that in this example the algorithm created some isolated "background" segments. In fact, the algorithm automatically decided which "background" seeds were grouped together and which were placed into isolated segments. The same is equally true for the "object" seeds. The segments can have any topology.

Figure 5A:
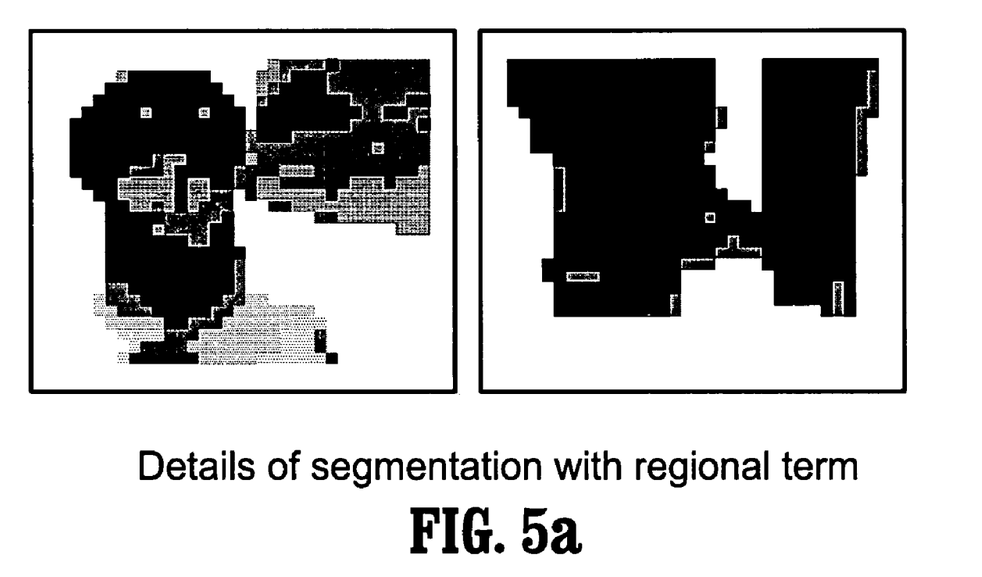
FIG. 5(a) illustrates segmentation of a photograph using graph cuts with the regional term included.
Figure 5B:
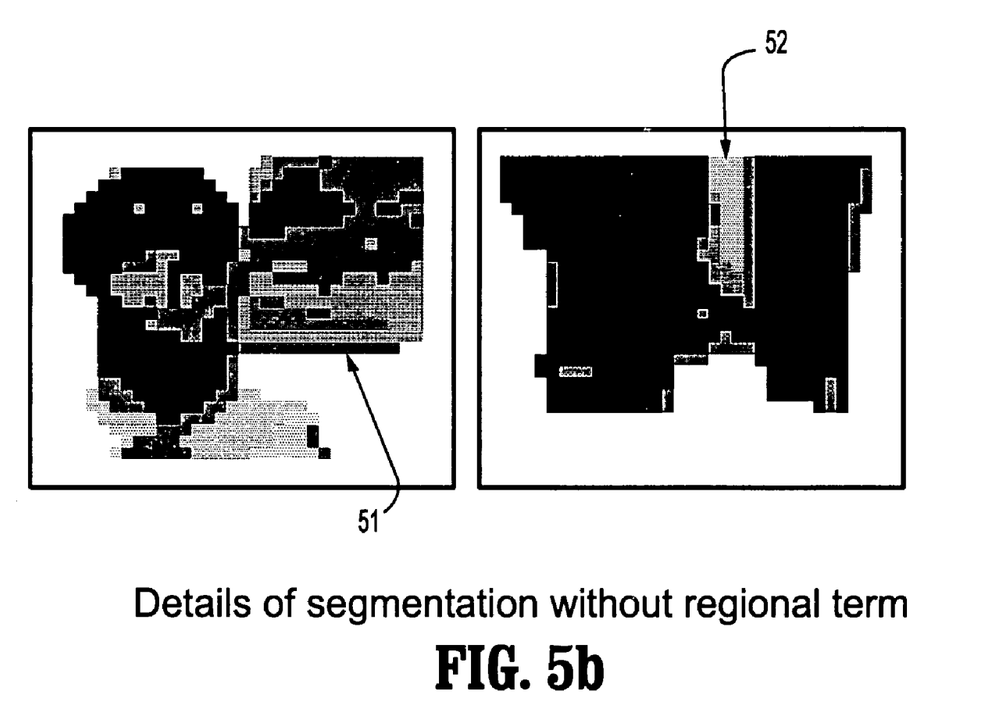
FIG. 5(b) illustrates segmentation of a photograph using graph cuts without the regional term.

In many cases the regional term of energy (1) helps to get the right results faster. In FIGS. 5(a) and 5(b) we show some details of segmentation with and without the regional term ($\lambda=0$) given the same sets of seeds. The left image of FIGS. 5(a)-(b) is taken from box 31 in FIG. 3(a), and the right image of FIGS. 5(a)-(b) is taken from box 32 in FIG. 3(a). FIG. 5(b) depicts regions 51 and 52 that were not properly segmented due to a lack of a regional term in the energy. In FIG. 5(b) the user would spend more time by placing additional "background" seeds to correct imperfections.

Figure 6:
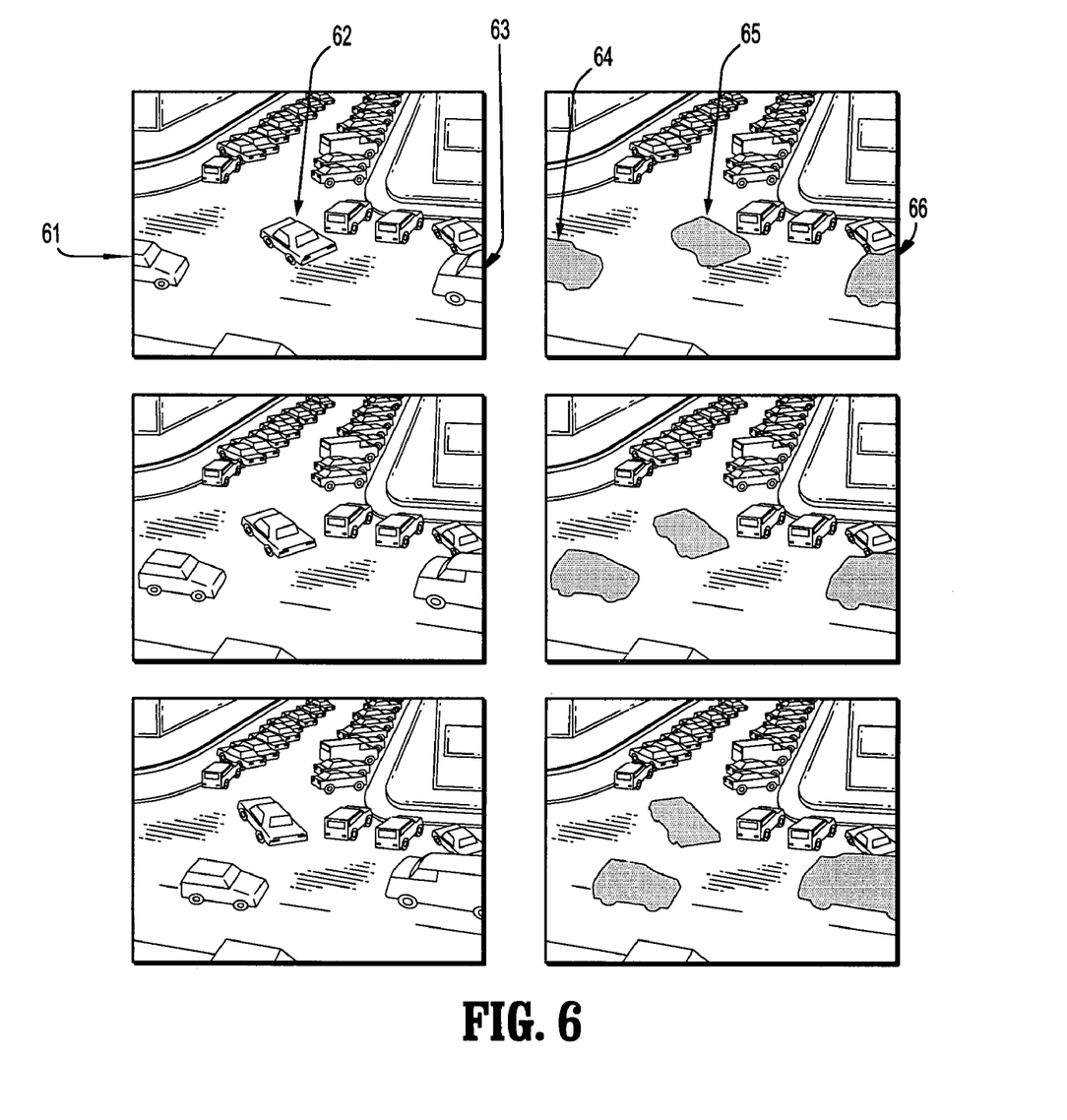
FIG. 6 illustrates segmentation of a video sequence using graph cuts.

The globally minimum two-terminal cut can be computed on any graph. Thus, our technique is valid for segmentation of N-D data. In FIG. 6 we segmented moving cars in a video sequence. The sequence of 21 video frames (255.times.189) was treated as a single 3D volume. The necessary seeds were entered in a simple 3D interface where we could browse through individual 2D slices (frames) of the volume. Initial seeds can be entered in just a few representative frames. Note that the boundary, region, and seed information is automatically propagated between the slices since we compute a globally optimum solution directly on the 3D data set. Thus, the whole sequence can be segmented based on seeds placed in just a few frames. For example, entering correcting seeds in one frame can fix imperfections in many adjacent frames. The results in FIG. 6 are obtained by placing seeds in 3 out of 21 frames. The left column of images in FIG. 6 depict the 3 selected frames, and the right column of images show the cars selected for segmentation blocked in white or gray. For the sake of clarity, only the top row of images is labeled. Cars 61, 62 and 63 on the left top image are segmented respectively as blocks 64, 65, and 66 in the to right image. Each car was segmented in an independent experiment We do not show seeds to avoid confusion.

The computation of the minimum cut is slower in 3D cases. The initial segmentation might take from 2-3 seconds on smaller volumes (200×200×10) to a few minutes on bigger ones (512×512×50). Thus, efficient re-computing of an optimal solution when new seeds are added is crucial. Most of the time the new seeds are incorporated in a few seconds even for bigger volumes. Therefore, we can still consider our method as "interactive". The results in FIG. 6 can be obtained in approximately 30 seconds including user interactions.

The process of placing seeds can be automated for certain applications. The seeds should be positioned with a low probability of "false alarm" while the probability of "right detect" is not required to be high. Even very simple recognition techniques based on filters might be good enough if the corresponding threshold is set high. Such filters would have difficulties near the boundaries of objects but they can confidently place many seeds anywhere else. These seeds give hard constraints. Based on additional soft constraints (1) the minimum cut can complete the segmentation where the recognition method failed.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An image editing system, comprising:
    an input device for inputting an image;
    a graphical user interface for selecting background and object seeds for the image; and
    an image processor for editing the image, the image processor including a segmentation routine that builds a graph associated with the image and uses a graph cut algorithm that uses said background and object seeds to cut the graph into segments.

2. The image editing system of claim 1, wherein nodes of the graph represent portions of the image.

3. The image editing system of claim 2, wherein the portions of the image are one of pixels and voxels.

4. The image editing system of claim 2, wherein the edges of the graph represents neighborhood relationships among the nodes.

5. The image editing system of claim 2, wherein the graph includes a background terminal node and an object terminal node.

6. The image editing system of claim 5, wherein each of the non-terminal nodes of the graph is connected to both the background terminal node and the object terminal node.

7. The image editing system of claim 6, wherein the edges of the graph are each assigned a cost value.

8. The image editing system of claim 7, wherein the cost values are determined according to a cost function that is defined in terms of boundary and region properties.

9. The image editing system of claim 8, wherein the cost function uses the background and object seed positions.

10. The image editing system of claim 7, wherein the graph is cut such that the total cost value of severed edges is minimized.

11. The image editing system of claim 1, further comprising an output device for displaying the segmented image.

12. The image editing system of claim 1, wherein the graphical user interface allows additional background and object seeds to be input.

13. A computer implemented method for editing a digital image, comprising the steps of:
    selecting background and object seeds for the image using a graphical user interface; and
    using a graphical user interface segmenting the image by building a graph associated with the image and using a graph cut algorithm to cut the graph into segments using said background and object seeds.

14. The computer implemented method of claim 13, wherein nodes of the graph represent portions of the image.

15. The computer implemented method of claim 14, wherein the portions of the image are one of pixels and voxels.

16. The computer implemented method of claim 14, wherein the edges of the graph represents neighborhood relationships among the nodes.

17. The computer implemented method of claim 14, wherein the graph includes a background terminal node and an object terminal node.

18. The computer implemented method of claim 17 wherein each of the non-terminal nodes of the graph is connected to both the background terminal node and the object terminal node.

19. The computer implemented method of claim 18, further including assigning a cost value to each of the edges of the graph.

20. The computer implemented method of claim 19, wherein the cost values are determined according to a cost function that is defined in terms of boundary and region properties.

21. The computer implemented method of claim 20, wherein the cost function uses the background and object seed positions.

22. The computer implemented method of claim 19, wherein the graph is cut such that the total cost value of severed edges is minimized.

23. The computer implemented method of claim 13. further including the step of displaying the segmented image.

24. The computer implemented method of claim 13, further including the step of selecting additional background and object seeds.

25. A program storage device readable by a machine, tangibly embodying a program of instructions executable on the machine to perform method steps for editing an image, comprising the method steps of:

selecting background and object seeds for the image using a graphical user interface; and using a graphical user interface segmenting the image by building a graph associated with the image and using a graph cut algorithm to cut the graph into segments using said background and object seeds.

* * * * *